US 6,739,126 B2

(12) United States Patent
Huthwohl

(10) Patent No.: US 6,739,126 B2
(45) Date of Patent: May 25, 2004

(54) REDUCING AGENT DOSING DEVICE

(75) Inventor: Georg Huthwohl, Soest (DE)

(73) Assignee: PUReM Abgassystem GmbH & Co.KG, Unna (DE)

( * ) Notice: Subject to any disclaimer, the term of this patent is extended or adjusted under 35 U.S.C. 154(b) by 0 days.

(21) Appl. No.: 10/308,591

(22) Filed: Dec. 3, 2002

(65) Prior Publication Data

US 2003/0101715 A1 Jun. 5, 2003

(30) Foreign Application Priority Data

Dec. 3, 2001 (DE) .................................. 201 19 513 U

(51) Int. Cl.⁷ ................................................ F01N 3/00
(52) U.S. Cl. ............................ 60/286; 60/295; 60/303; 123/514
(58) Field of Search ........................ 60/279, 283, 286, 60/295, 303; 123/514, 557

(56) References Cited

U.S. PATENT DOCUMENTS

| | | | | |
|---|---|---|---|---|
| 4,326,492 A | * | 4/1982 | Leibrand et al. | 123/557 |
| 5,533,486 A | * | 7/1996 | Qutub | 123/541 |
| 5,665,318 A | * | 9/1997 | Rembold et al. | 422/177 |
| 5,809,774 A | * | 9/1998 | Peter-Hoblyn et al. | 60/274 |
| 5,968,464 A | | 10/1999 | Peter-Hoblyn et al. | |
| 5,974,785 A | * | 11/1999 | Cunningham et al. | 60/274 |
| 6,370,871 B2 | * | 4/2002 | Suzuki et al. | 60/286 |

FOREIGN PATENT DOCUMENTS

| | | |
|---|---|---|
| DE | 44 32 576 A1 | 3/1996 |
| DE | 195 31 028 A1 | 2/1997 |
| DE | 197 07 849 A1 | 9/1998 |
| DE | 19856366 C1 | 4/2000 |
| DE | 199 47 198 A1 | 4/2001 |
| WO | WO 96/08639 | 3/1996 |
| WO | WO 99/67512 | 12/1999 |

OTHER PUBLICATIONS

U.S. patent application Ser. No. 10/266,057, Overhoff et al., filed Oct. 7, 2002.
U.S. patent application Ser. No. 10/307,592, Huthwohl et al., filed Dec. 2, 2002.

* cited by examiner

Primary Examiner—Binh Tran
(74) Attorney, Agent, or Firm—Rick Martin; Patent Law Offices of Rick Martin, P.C.

(57) ABSTRACT

A reducing agent dosing device for delivering a reducing agent into the exhaust gas system of the internal combustion engine of a motor vehicle is disclosed. The internal combustion engine has fuel carried along in a fuel tank with a fuel return line disposed between the internal combustion engine and the fuel tank. The reducing agent dosing device has a reducing agent tank connected to exhaust gas system of the internal combustion engine by a supply line. The supply line for is disposed such that it is in heat-conducting connection with the fuel return line of the internal combustion engine to heat the reducing agent carried in the supply line.

9 Claims, 1 Drawing Sheet

REDUCING AGENT DOSING DEVICE

CROSS REFERENCE APPLICATIONS

This application claims priority from German application no. 201 19 513.5 filed Dec. 3, 2001.

FIELD OF INVENTION

The present invention relates to a reducing agent dosing device for delivering a reducing agent into the exhaust gas system of the internal combustion engine of a motor vehicle. The internal combustion engine has fuel transported in a fuel tank and a fuel return line is disposed between the internal combustion engine and the fuel tank. The reducing agent dosing device has a reducing agent tank and a supply line connecting the reducing agent tank with the exhaust gas system of the internal combustion engine.

BACKGROUND OF THE INVENTION

Apart from carbon monoxide (CO) and hydrocarbons (HC), nitric oxides ($NO_x$) are among the environmentally harmful, directly emitted, primary injurious substances which are generated during the operation of internal combustion engines, particularly diesel engines. Three-way catalysts, which are used in Otto engines and gas engines, cannot be used in the exhaust gas of diesel engines due to an oxygen excess. For this reason, to reduce nitric oxide emission in diesel engines a selectively operating SCR catalyst (Selective Catalytic Reduction Catalyst) has been developed in which, in the presence of an added reducing agent, namely ammonia ($NH_3$), the expelled nitric oxides are reduced to $N_2$ and $H_2O$.

The ammonia required for carrying out the reduction can be transported along on board of the motor vehicle in different forms. The pure ammonia can be in the gaseous or also in the liquid phase. To avoid problems in handling the pure ammonia, it is preferably stored in bound form on the motor vehicle, for example in a tank. The ammonia carried in the bound form is hydrolytically split either in the exhaust gas system or preceding it to release the bound ammonia. One such a reducing agent is an aqueous solution of urea. The urea solution is stored in a reducing agent tank. The tank is connected over a supply line to the exhaust gas system of the internal combustion engine.

A dosing valve positioned on the exhaust gas system serves to deliver the required quantity of urea. The temperatures obtained in the exhaust gas system immediately gasify the urea, releasing the ammonia required for carrying out the nitric oxide reduction.

Due to the disposition of the dosing valve immediately on the exhaust gas system in the know prior art, the input side of the dosing valve must be cooled to prevent the liquid urea solution decomposing or crystallizing out due to the high temperatures. Such reducing agent dosing devices are known in the art, for example from DE 198 56 366 C1.

According to a further known implementation the dosing valve is disposed directly beneath the reducing agent tank and is connected with the exhaust gas system over a delivery line that is several meters long. Compressed air from the air compressor for the brake system transports the quantity of urea solution in the delivery line. The dosed urea solution quantity is, therefore, transported in the supply line as an aerosol.

There are known disadvantages in using of an aqueous urea solution as the reducing agent. One disadvantage is that the reducing agent dosing devices can only operate as specified at temperatures above the freezing point of the urea solution. Therefore, an aqueous urea solution can only be used as reducing agent only with additional heating devices. It is also necessary to heat inter alia the supply line used for the transport of the reducing agent in a liquid or an aerosol to prevent temperatures below the freezing point of the aqueous urea solution. Resistance heaters are conventionally used as heaters. Other heat providers can only be utilized with considerable expenditure for heating the supply line extending between the reducing agent tank and the exhaust gas system. For example, the cooling water, which becomes warm during the operation of the internal combustion engine, could be used. But the use of resistance heaters entails expenditures, since it must be ensured that overheating is avoided.

Building on this discussed prior art, the present invention addresses the problem of developing a reducing agent dosing device in which the supply line can be heated to temperatures, at least in the relevant sections during operation of the device, without having to tolerate the disadvantages demonstrated to be entailed in prior art.

This problem is solved according to the invention by having the supply line disposed such that it is connected with the fuel return line of the internal combustion engine in such manner that it is conducting heat.

SUMMARY OF THE INVENTION

The primary aspect of the present invention is to provide a reducing agent dosing device with a headed supply line.

Other aspects of this invention will appear from the following description and appended claims, reference being made to the accompanying drawings forming a part of this specification wherein like reference characters designate corresponding parts in the several views.

The reducing agent dosing device of the present invention has a supply line for transporting the reducing agent from a reducing agent tank to the exhaust gas system which is in heat-conducting connection to the fuel return line. This allows the heat contained in the fuel return line, which, as a rule, does not exceed 60–70° C. during operation of the internal combustion engine, to heat the supply line, or at least its critical sections. It is especially advantageous that normally the fuel tank and the reducing agent container are disposed adjacent to one another. Therefore, the course of the supply line is usefully disposed parallel to the fuel return line. Both lines can be combined in a double tube developed as a double-walled tube with two concentric channels or also as channels extending parallel to one another. Consequently, the expenditure for the adequate heating of the supply line is reduced to a minimum. In particular, no additional regulation of the heat is required since the decomposition temperature of the urea, transported optionally in aqueous form in the supply line, is never exceeded.

Another advantage is that cooling of the fuel transported back in the fuel return line can also take place such that further cooling measures for cooling the returning fuel are in principle not necessary. The required heat in the fuel return line is available after an extremely short operating time of the internal combustion engine. In particular, the heat is available substantially earlier than when using cooling water, which must generally be heated through longer operation of the internal combustion engine.

Since the fuel return line extends from the fuel tank to the internal combustion engine, it is readily possible to heat substantially the entire supply line between the reducing agent tank and the dosing valve, in the event that the latter is disposed in the proximity of the exhaust gas system or the internal combustion engine for the output of the desired quantity of urea.

In a preferred embodiment of the reducing agent dosing device the dosing valve is located in direct association with the internal combustion engine. A liquid aqueous urea solution is present at the input side of the dosing valve. The dosing valve itself terminates in a delivery line supplied with compressed air. The delivery line is usefully supplied with compressed air by the charge air of the charging group of the internal combustion engine (for example turbocharger or compressor). One advantage of this system is that the dosing valve is disposed in the immediate proximity of the internal combustion engine and consequently is also heated by it. Additionally, the dosing valve is not positioned directly on the exhaust gas system such that this would necessitate cooling.

Utilizing compressed air as the transport medium for transporting the dosed quantity of urea in the form of an aerosol has the advantage that the quantity of air required for transporting the reducing agent output by the dosing valve is only very small in comparison to the quantity of air made available by the turbocharger and this branching-off of air is without further effects on the specified operation of the turbocharger. In particular when employing charge air in the described manner, the charge air can be removed before or after the charging-air cooler, such that air of different temperatures is available for mixing.

Figure 1:
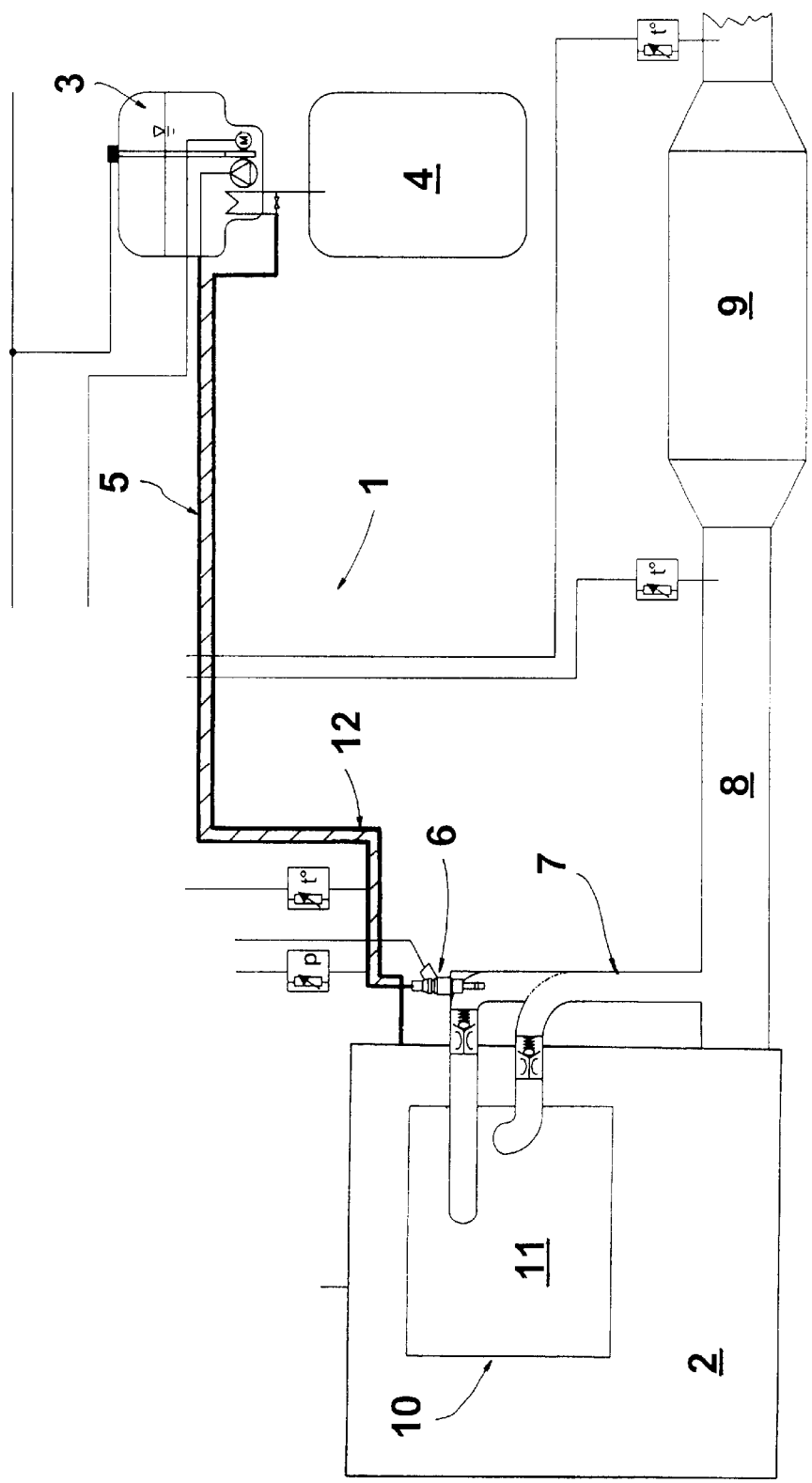
FIG. 1 is a block diagram of the present invention.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Referring first to FIG. 1, a reducing agent dosing device 1 for delivering urea into the exhaust gas system of a diesel engine 2 is shown. The reducing agent dosing device 1 has a reducing agent tank 3 disposed adjacent to the fuel tank 4, in which the fuel for operating the internal combustion engine 2 is stored. The reducing agent tank 3 is connected to a dosing valve 6 by a supply line 5.

The dosing valve 6 is associated with the internal combustion engine 2, which is a diesel engine in the depicted example. At the output side, the dosing valve 6 extends into a delivery line 7, which is supplied with compressed air. The delivery line 7 terminates in the exhaust gas system 8 of the internal combustion engine 2. The termination of the delivery line 7 in the exhaust gas system 8 is located preceding an SCR catalyst 9.

In the depicted embodiment example the delivery line 7 is supplied with the charge air of a turbocharger 10 associated with the internal combustion engine 2. The reducing agent quantity output of the dosing valve 6 is therefore transported as an aerosol in the delivery line 7. The compressed air to be conducted to the delivery line 7 can, as depicted in FIG. 1, be removed before and/or after the charging-air cooler 11, such that the reducing agent transported in the delivery line 7 as an aerosol has the appropriate temperature before it enters the exhaust gas system 8.

The dosing valve 6 is driven by an engine management system not further depicted, such that the quantity of reducing agent required according to the particular engine state can be delivered.

A fuel return line 12 is disposed between the internal combustion engine 2 and the fuel tank 4. The fuel transported in the fuel return line 12 from the internal combustion engine 2 back to the fuel tank 4, has a temperature between 50 and 70° C. after an extremely short operating time of the internal combustion engine. In heat-conducting connection with the fuel return line 12, the supply line 5 is provided for supplying the reducing agent from the reducing agent tank 3 to the dosing valve 6. The section of the supply line 5 that is in heat-conducting connection with the fuel return line 12 is hatched in the Figure. In the representation it is evident that substantially all of the supply line 5 is in heat-conducting connection with the fuel return line 12. The heat-conducting connection between the two lines 5, 12 can be formed by a double tube with two channels extending parallel to one another. The two lines can be connected by a web, or they can also be individual lines connected with one another by a joining connection.

One advantage of heating the supply line 5 with the heat of the fuel transported in the fuel return line 12 is that this heat source does not exceed the decomposition temperature of the aqueous urea solution employed as the reducing agent. Another advantage is that with the fuel return line 12 already laid out in the motor vehicle, a suitable line course is predetermined for the supply line 5. Therefore, that no new line course needs to be conceived for the course of the supply line.

With the described reducing agent dosing device 1 it is possible to use aqueous urea solution as reducing agent, even at low temperatures. In particular, aqueous urea can be used at temperatures below the freezing point of the solution without excessive expenditures to heat the supply line 5.

It is also possible to use the present invention to heat the supply line 5 in reducing agent dosing devices where the dosing valve is located in the immediate proximity of the reducing agent tank or is integrated into it. The heating of the supply line 5 is also necessary in these cases in order to ensure the transport of the aerosol in the supply line.

The term reducing agents used within the scope of these explanations is to be understood to include either the reducing agent itself or something containing the reducing agent as a component. This is the case when using an aqueous urea solution in which the ammonia component represents the reducing agent proper.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

LIST OF REFERENCE NUMBERS

1 Reducing agent dosing device
2 Internal combustion engine
3 Reducing agent tank
4 Fuel tank
5 Supply line
6 Dosing valve
7 Delivery line
8 Exhaust gas system
9 SCR catalyst
10 Turbocharger
11 Charge-air cooler
12 Fuel return line

I claim:

1. A reducing agent dosing device for delivering a reducing agent into the exhaust gas system of an internal combustion engine of a motor vehicle, wherein the internal combustion engine has a fuel carried along in a fuel tank and a fuel return line disposed between the internal combustion engine and the fuel tank, said reducing agent dosing device comprising:

a reducing agent tank;

a supply line connecting the reducing agent tank with an exhaust gas system of the internal combustion engine;

the supply line being disposed in heat-conducting connection with the fuel return line of the internal combustion engine, functioning to heat the supply line.

2. The reducing agent dosing device as claimed in claim 1, wherein the reducing agent tank and the fuel tank are disposed adjacent to one another and the supply line is in heat-conducting connection with the fuel return line over substantially all of the length of the supply line.

3. The reducing agent dosing device as claimed in one of claims 1 or 2, wherein an aqueous urea solution is provided as the reducing agent.

4. The reducing agent dosing device as claimed in claim 1 or 2, wherein the supply line is connected to a dosing valve associated with the internal combustion engine.

5. The reducing agent dosing device as claimed in claim 4, wherein the dosing valve is connected at an output side by a delivery line to the exhaust gas system, said delivery line being supplied with compressed air.

6. The reducing agent dosing device as claimed in claim 5, wherein the delivery line at the input side is supplied with compressed air by the charge air of a charging group of the internal combustion engine.

7. The reducing agent dosing device as claimed claim 6, wherein an aqueous urea solution is provided as the reducing agent.

8. The reducing agent dosing device as claimed claim 5, wherein an aqueous urea solution is provided as the reducing agent.

9. The reducing agent dosing device as claimed claim 4, wherein an aqueous urea solution is provided as the reducing agent.

* * * * *